Jan. 14, 1964   G. JANSEN   3,117,485
CLAMP NUT DEVICE
Filed June 22, 1960

INVENTOR.
GERHARD JANSEN
BY *M. Ralph Shaffer*
HIS ATTORNEY

United States Patent Office 3,117,485
Patented Jan. 14, 1964

3,117,485
CLAMP NUT DEVICE
Gerhart Jansen, 918 E. South Temple,
Salt Lake City, Utah
Filed June 22, 1960, Ser. No. 38,063
1 Claim. (Cl. 85—36)

This invention relates to clamping devices for fixedly clamping bolts, shafts, studs, wire and so forth and, in particular, is useful for securing equipment to a mounting plate, baffle or bulkhead where the equipment is provided with mounting bolts or studs, for example, be they threaded or unthreaded.

The invention presents an improvement in existing devices of the type described (see the inventor's United States Patents Nos. 2,935,299 and 2,896,496 and the inventor's copending case, Serial No. 818,605 filed June 8, 1959, now U.S. Patent 3,049,368) in that a quick release is provided so as to avoid the necessity of rearwardly threading the conventional cap nut generally supplied.

A principal object of the invention, therefore, is to provide a new and improved clamp nut device wherein a quick release mechanism is supplied so that the device may be removed from clamping engagement in a quick and easy manner, this by selectively lessening spring pressure upon the clamping jaw means so that the force of bite thereof is reduced.

An additional object of the invention is to provide a new and improved clamp nut device wherein removal of hand pressure from the release mechanism will instantly cause the device to grip the bolt or stud upon which the device is mounted.

The features of the present invention which are believed to be novel are set forth with particularity in the appended claim. The present invention, both as to its organization and manner of operation, together with further objects and advantages thereof, may best be understood by reference to the following description, taken in connection with the accompanying drawings in which:

Figure 1:
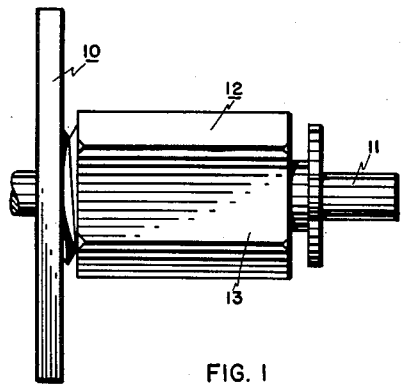
FIGURE 1 is an elevation of one form of the present invention.
Figure 2:
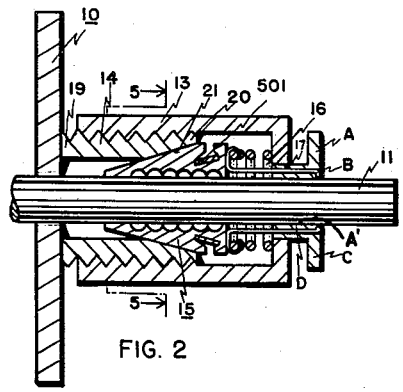
FIGURE 2 is a vertical section of the device of FIGURE 1.

In FIGURES 1 and 2 external member 10 represents a bulkhead, mounting plate or the like. Passing through external member 10 is an additional external member 11 which may consist of a shaft, stud, bolt or the like. (Let it be assumed initially that it is desirous for member 11 to be clamped by the improved clamp nut device 19, the latter perhaps to apply a force of tension to member 11.) Device 12 includes an internally threaded cap 13, an externally threaded tubular carrier 14, gripping means 15, and compression spring 16 comprising plural convolutions as shown. As is seen with reference to FIGURE 2, external member 11 passes through an aperture 17 provided in the base 18 of cap 13. Cap 13 itself is threaded onto carrier 14. Carrier 14 has first and second end portions 19 and 20, the latter being provided with an interior socket 21. Jaw means 15 is externally tapered and cooperates with socket 21 so as to bite into external member 11 when thrust is supplied by cap 13 via compression spring 16.

Figure 4:
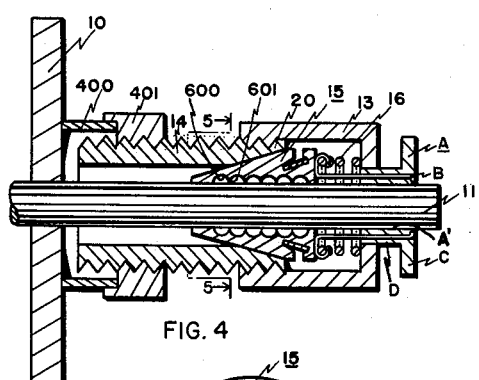
FIGURE 4 is a vertical section of the device shown in FIGURE 3.
Figure 2A:
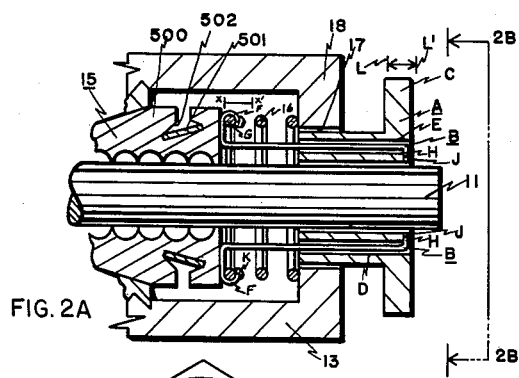
FIGURE 2A is an enlarged detail of a portion of the device as illustrated in FIGURE 2.
Figure 5:
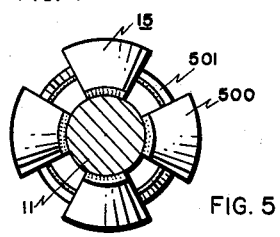
FIGURE 5 is an enlarged section taken along the line 5—5 in FIGURES 2 and 4, showing with particularity the jaw gripping means employed by the present invention in both embodiments thereof.
Figure 6:
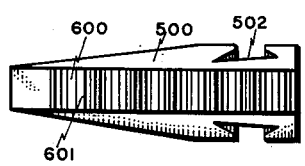
FIGURE 6 is an elevation of a representative jaw gripping element employed by the present invention.

The jaw gripping means 15 is indicated with particularity in FIGURE 5 (in addition to the illustrations of FIGURES 2, 2A and 4). For purposes of convenience of illustration, FIGURE 5 does not illustrate either the cylindrical carrier 14 or the cap 13. In FIGURE 5 jaw gripping means 15 is shown to comprise a plurality of jaw elements 500 circumferentially contained by a C-configured, tapered spring 501. Each of the jaw gripping elements 500 preferably is provided with an external tapered surface and an interior serrated surface of generally cylindrical configuration. The jaw gripping elements 500 are also provided with an exterior groove 502 (see also FIGURES 2 and 4) so as to accommodate the seating therewithin of the spring 501. The action of spring 501 within groove 502 is fully explained in the inventor's United States Patent No. 2,896,496, which case is incorporated herein by reference. (Also incorporated by reference is the inventor's case U.S. Patent No. 2,935,299 which fully illustrates the operation of the jaw means 15 and in particular the several jaw elements 500.) As is seen in FIGURES 5 and 6, the jaw means 15 comprises a plurality of jaw elements 500, and each of the latter is provided with a manular groove 501, and a plurality of indentations 600 defining teeth 601.

As explained in the aforementioned patents, the tightening down of cap 13 serves to increase the pressure exerted by compression spring 16 upon the gripping means 15 (i.e. the plurality of jaw gripping elements 500), causing the latter to bite down more forceably upon external member 11 and to increase the tension upon external member 11 once the cap 13 progresses to the left beyond the forward end portion 19 of tubular carrier 14.

Figure 2B:
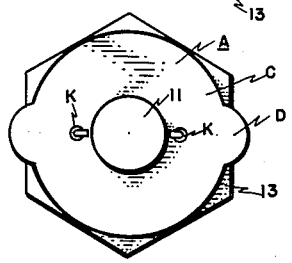
FIGURE 2B is an end elevation taken along the line 2B—2B in FIGURE 2A and is rotated 90° for convenience of illustration.

It may well be desirous to release the jaw gripping means without having to thread rearwardly the cap 13. The present invention provides a means to accomplish this release. Reference is now made to FIGURE 2 wherein it is seen that a flanged sleeve A is provided in conjunction with wires B. Flanged sleeve A is provided with a flange portion or gripping means C and a sleeve portion D, the latter provided with bore A', of sufficient size to admit external elongate member 11, and fitting into aperture 17 associated with base 18 of cap 13. A pair of ear portions D' are supplied the flange portion C of the flanged sleeve A as illustrated in FIGURE 2B. These ears D are to aid the artisan in gripping the flange sleeve A with his thumb and fingers so as to pull outwardly upon the flange sleeve A.

The flanged sleeve A is provided with a pair (or one or more) of apertures E which are longitudinal in this position. These apertures D admit elongate members or wires B which are connected at wire ends F to turn G of compression spring 16. The remaining ends H of wires B are bent as illustrated to seat within recesses J of the flanged sleeve A. Solder K may be used to secure the opposite ends of wires B in their place.

The release action becomes clear upon reference to FIGURE 2. When the operator urges by his other fingers the flanged sleeve from position L to position L', then this will cause a translation to the right of wires B a similar distance X—X' so as to compress the spring 16. (It should be mentioned at this point that the wires B may be attached to turns of compression spring 16 other than the one directly adjacent the jaw means 15.) Thus, when the operator pulls outwardly upon flange sleeve A, the wires B compress the spring 16 away from jaw means 15 so as to release the pressure upon jaw means 15. This will permit the operator to withdraw rapidly the clamp nut device 12 from the external member 11 without threading in a rearward direction the cap 13.

Figure 3:
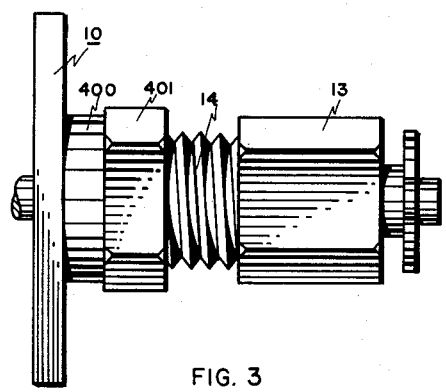
FIGURE 3 is an elevation of a second embodiment of the invention.

FIGURES 3 and 4 represent a second embodiment wherein the release of the invention may be employed. The embodiment illustrated in FIGURES 3 and 4 is fully explained in the inventor's Patent 2,935,299. Sleeve member 400 and nut 401 are supplied as tension producing elements once the jaw means 15 is set by cap 13 onto external member 11. The flanged sleeve A in conjunction with wires B are connected in exactly the same manner to compression spring 16 as illustrated in FIGURE 2A. Thus, the flanged sleeve release is applicable to both embodiments of the invention.

Other types of relief actuators conceivably could be employed without retarding from this invention; also, the aperture configuration might also be modified as is found to be expedient. The essence of the invention resides in the fact that a withdrawable release is supplied the clamp nut device so as to compress the spring 16 away from the jaw means 15 which would otherwise urge the clamping means of the device into engagement with the bolt shaft or stud with which the device is used.

While particular embodiments of the present invention have been shown and described, it will be obvious to those skilled in the art that changes and modifications may be made without departing from this invention in its broader aspects, and, therefore, the aim in the appended claim is to cover all such changes and modifications as fall within the true spirit and scope of this invention.

I claim:

An improved, clamp nut device including, in combination, an externally threaded tubular carrier having first and second end portions, said second end portion being provided with an interior, tapered socket; externally tapered jaw means, for gripping an external elongate member, disposed interiorly of and associated cooperatively with said tapered socket; an internally threaded cap threaded onto said second end portion of said tubular carrier for advancement toward said jaw means, said cap being provided with a base aperture aligned with said jaw means; a compression spring cooperatively disposed between said jaw means and said cap and comprising plural convolutions; and manually withdrawable means translatably disposed in said aperture for selectively compressing said spring in a direction away from said jaw means, said manually withdrawable means being provided with gripping means disposed exteriorly of said cap and a bore axially aligned with said jaw means and of sufficient size to admit therethrough said external elongate member passing through said jaw means, said withdrawable means comprises a flanged sleeve provided with a sleeve portion withdrawably disposed within said cap base aperture and a flange portion graspable by the thumb and fingers constituting said gripping means, and means intercoupling said compression spring with said flanged sleeve for compressing said spring against said cap, said intercoupling means comprising elongate members affixed to said flanged sleeve and connected to said spring at the spring convolution nearest said jaw means.

References Cited in the file of this patent

UNITED STATES PATENTS

| | | |
|---|---|---|
| 2,288,138 | Jugle | June 30, 1942 |
| 2,593,662 | Dickinson | Apr. 22, 1952 |
| 2,621,386 | Bowder | Dec. 16, 1952 |
| 2,896,496 | Jansen | July 28, 1959 |